Patented June 27, 1944

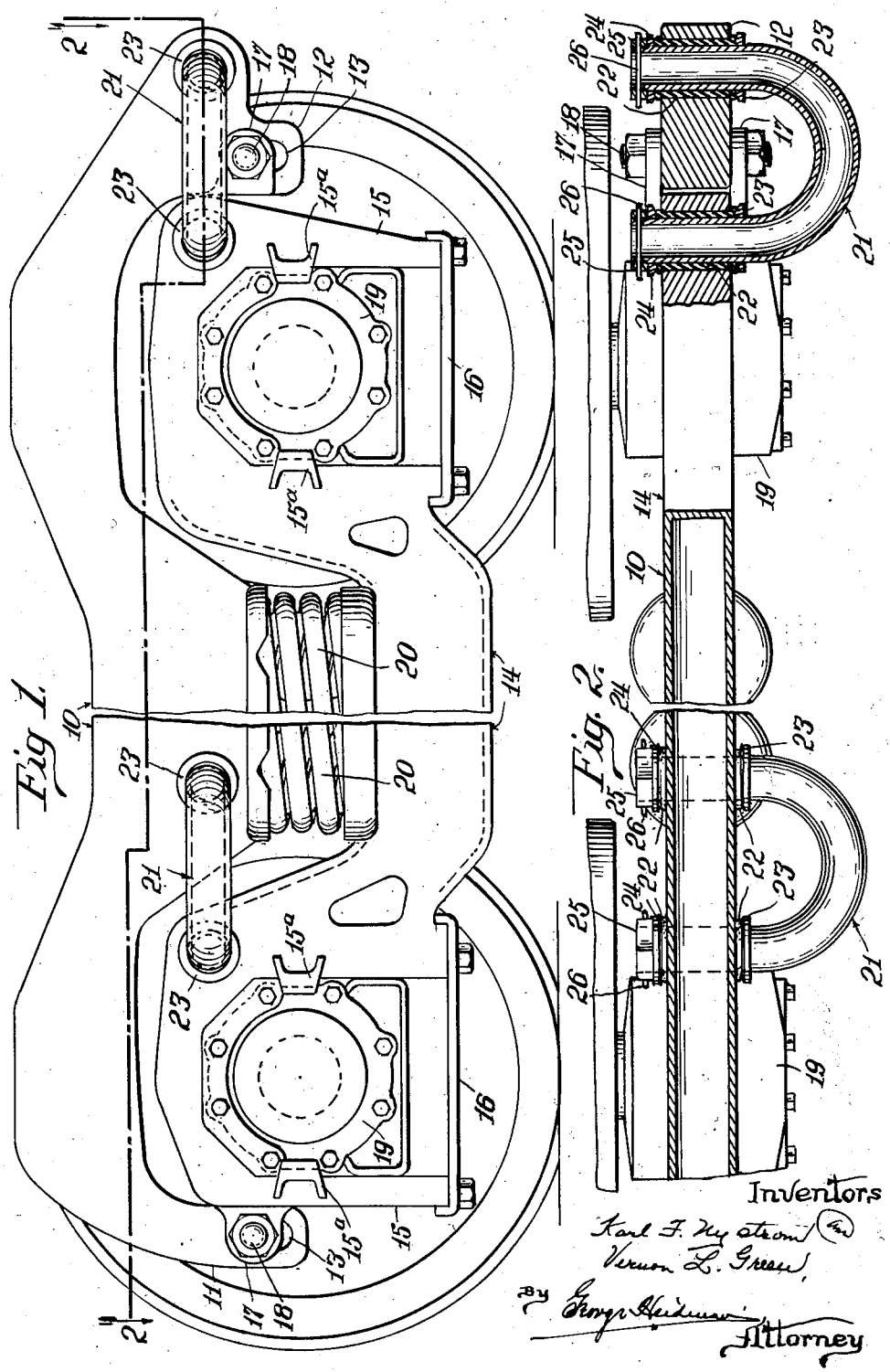

2,352,400

UNITED STATES PATENT OFFICE 2,352,400

RAILROAD PASSENGER CAR TRUCK

Karl F. Nystrom and Vernon L. Green, Milwaukee, Wis.

Application September 11, 1941, Serial No. 410,355

8 Claims. (Cl. 105—194)

Our invention relates to improvements in passenger car trucks and more particularly the four wheel type provided with roller bearings mounted in suitable housings at the ends of the axles and has for its object a construction in which metallic contact between the truck frame and the equalizers of the truck, as well as friction, will be eliminated and the springs maintained free of snubbing.

The invention also contemplates the use of single piece equalizers whereby accurate spacing between the axles is obtained; the equalizers being formed with integral journal housings or yokes, while the usual pedestals on the truck frame for receiving the journal bearing housings are eliminated.

Our invention also involves the use of suitable links whereby the equalizers and the truck frame are resiliently linked together, with the points of connection between the links and the frame and equalizers being effected through the medium of resilient or compressible rubber elements adapted to also be placed in tension as well as shear.

The invention contemplates a structure which will eliminate the wear heretofore encountered between the outer housings of the journal bearings and whereby a smoother riding truck is provided.

The objects and advantages of our invention will be readily comprehended from the detailed description of the accompanying drawing wherein:

Figure 1 is a side elevation of a car truck with intermediate portions broken away and illustrating our invention.

Figure 2 is a longitudinal sectional plan taken on the line 2—2 of Figure 1, looking downwardly, with the end portions of the truck broken away.

In the drawing merely one side of a railroad car truck is shown, but it will be understood that the construction of the truck frame on the opposite side is similar to that shown in Figure 1 and that a similar equalizer and method of connection between the equalizer and truck frame also is employed, so that description of one side of the truck will suffice.

The truck as illustrated in Figure 1 involves the truck frame 10 provided with downwardly disposed portions 11, 12, the portion 12 being slightly removed from the immediate end of the frame; both portions 11 and 12 being provided with vertically disposed slots 13.

Located beneath the frame 10 is an equalizer member 14 whose ends terminate in journal bearing receiving housings or vertically disposed inverted U-shape yokes 15, 15 which preferably are open at the bottom and provided with tie-straps 16 bolted thereto.

The ends of the equalizer member 14 are each shown provided with a clevis 17 which straddles the adjacent frame portions 11 and 12 and is provided with a hole registering with the slots 13 and is provided with a pin 18. The elements just described provide loose connections between the combination equalizer and journal bearing receiving housing unit and the truck frame which will prevent separation of the unit and frame in the event of derailment and also maintain approximate wheel alignment in the event of failure of the wheel squaring devices to be described.

The yokes or housings 15 of the equalizer member are shown provided with the opposingly disposed stop lugs or abutments 15$^a$ adapted to prevent outward movement of the roller bearing housings 19 mounted on the ends of the wheel journals.

The truck frame 10 is yieldingly supported on the equalizer and journal housing unit 14 by the usual springs as shown at 20.

In order to maintain the wheels square, or in definite tram, we connect the frame 10 to the combination equalizer unit 14 by means of the U-shape shackles 21, 21 arranged to the same side of the adjacent wheels, or as shown in Figure 1 to the right of the respective wheels so as not to offset or counteract each other. The shackles 21 may be of tubular construction as shown with one end disposed through a suitable hole in the upper portion of each journal bearing receiving yoke or housing, while the other end of the shackle is disposed through a suitable hole in the truck frame 10. The shackles extend horizontally outward from the truck as shown in Figure 2 and their ends are provided with tubular rubber sleeves or bushings 22 of suitable thickness and of length somewhat greater than the transverse thickness of the equalizer unit and of the side portion of the truck frame as shown in Figure 2.

Each leg or side of each shackle 21, removed from its immediate end, is preferably provided with a flange as at 23, preferably in the form of a beveled washer welded to the U-shape shackle or connecting link. The ends of the U-shape links extend beyond the ends of the tubular rubber bushings and are provided with suitable washers 24 which bear against the enlarged rims on the tubular bushings 22; the washers 24 being held in place by nuts 25 which screw onto the threaded ends of the shackles 21 and are preferably held against unscrewing by cotter pins 26 which pass through registering holes in the nuts and shackle ends. As is apparent from the construction shown, the tubular bushings 22 provide a non-metallic connection between the shackles and the equalizer unit and truck frame; the bushings 22 being held under compression by screwing up of the nuts 25. The U-shape elements constitute combination lateral and longitudinal types of drawbars whereby the longitudinal movements of the equalizer units are transmitted to the truck frame, or vice versa, as well as any relative transverse movements between the equalizer units and the truck frame; the elements also compensating for any relative vertical movements of the equalizer units and truck frame; the vibrations being absorbed by the non-metallic or rubber bushings which eliminate metallic contact between the equalizer units and the truck frame.

The structure eliminates the use of the conventional pedestals on the frame as well as the usual outer bearing housings which were slidably arranged in the pedestals and which were subject to considerable wear and affected the riding qualities of the truck; the improved structure maintaining the wheels square or in definite tram; at the same time providing an accurate spacing of the wheel axles and preventing snubbing of the truck springs.

The exemplification is believed to be the best embodiment of the invention but certain structural modifications may be made without, however, departing from the spirit of our invention as defined in the appended claims.

What we claim is:

1. In a railroad car truck, the combination of equalizer members provided with vertically disposed yokes adapted to receive the journal bearing housings; a truck frame arranged above and resiliently mounted on an intermediate portion of the equalizer members with portions of the frame extending downwardly into the horizontal plane of the yokes of the equalizer members; and horizontally disposed U-shape shackles, each having one leg disposed through an opening in the yoke portion of the equalizer member while the other leg is disposed through a horizontally aligned opening in the truck frame, the apertured shackle leg receiving portions of the yokes and of the truck frame being of comparative width to provide long bearings for the shackle legs, the shackle-legs being arranged to permit relative rotative movement between the legs, the equalizer yokes and the frame and with the shackles arranged at the same sides of the yokes relative to one end of the truck to permit relative vertical movement between the truck frame and the equalizer members and to restrain relative lateral and longitudinal movements between the frame and the equalizer members.

2. In a railroad car truck, an equalizer member provided at its ends with journal bearing receiving yokes; a truck frame arranged above the equalizer member and resiliently mounted on the equalizer member intermediate its yokes with portions extending downwardly into the horizontal plane of portions of the equalizer member; a pair of horizontally disposed U-shape shackles for yieldingly linking the equalizer member and the truck frame, each shackle having one leg disposed through an opening in the equalizer member while the other leg is disposed through an opening in the truck frame, the legs being arranged to permit relative rotative movement between the shackle, the equalizer and the frame; compressible resilient means arranged in the openings about each leg of the shackles; and means cooperating with the shackles for securing the latter in place and compressing said resilient means.

3. In a railroad car truck, an equalizer unit on each side of the truck, provided at its ends with vertically disposed journal bearing housing receiving yokes formed integral therewith; a truck frame arranged above the equalizer units and resiliently mounted on the equalizer unit intermediate the yokes with portions of the frame disposed beneath the tops of the yokes; horizontally disposed U-shape wheel tram maintaining shackles each consisting of a single piece arranged in the same horizontal plane on similar sides of the yokes relative to one end of the truck frame, one leg of each shackle being disposed through an opening in the equalizer unit while the other leg of each shackle extends through an opening in the frame and adapted to permit relative rotary movement between the shackles, the equalizer units and the truck frame; resilient bushings mounted on the legs of the shackles; means arranged in spaced relation on the shackle-legs whereby the bushings may be placed under compression; and means whereby said first means may be placed into bushing compression relation and the shackles removably secured in place.

4. In a railway truck, an axle and wheel, a journal box carried thereby, an equalizer supported upon the journal box and extending longitudinally of the truck, the equalizer and journal box being movable together vertically of the truck and being held against relative movement longitudinally of the truck, a load carrying truck frame spring-supported on the equalizer and free of association with the journal box except through the equalizer, and anchor means arranged adjacent the ends of the equalizer and the truck frame with the end portions connected, respectively, to the equalizer and to the truck frame to hold the equalizer and the truck frame against substantial movement relative to each other transversely of the truck but accommodating their movement relative to each other in a vertical direction.

5. In a railway truck, wheels and axles, journal boxes for said axles, equalizers on opposite sides of the truck supported by said boxes and having end portions adapted to receive said boxes whereby each equalizer and the corresponding boxes move as a unit in the truck, a truck frame spring supported on said equalizers and free of direct engagement with said equalizers and free of association with the journal boxes except through said equalizers, and a horizontally disposed U-shape anchor one leg whereof is swiveled in an opening in the truck frame while the other leg is swivelled in an opening in the adjacent equalizer whereby the portion of the equalizer to which said anchor is connected is held against substantial movement relative to said truck frame longitudinally and transversely of the truck while accommodating relative vertical movement between the truck frame and the equalizer.

6. A structure as described in claim 5 in which the connections between the anchor and the equalizer and between the anchor and the truck frame include resilient means to cushion forces transmitted between the equalizer and the truck frame.

7. In a railway truck, wheels and axles, journal boxes for said axles, equalizers on opposite sides of the truck supported by said boxes and having end portions adapted to receive said boxes whereby each equalizer and the corresponding boxes move as a unit in the truck, a truck frame spring supported on said equalizers and free of association with the journal boxes except through said equalizers, a pair of U-shape anchors between at least one of the equalizers and the truck frame, one of said anchors being connected to the equalizer inwardly of the journal box and to the truck frame at a point spaced in a longitudinal direction inwardly of its connection to the equalizer, the other anchor being connected to the equalizer at a point spaced outwardly of the other journal box and to the truck frame at a point spaced in a longitudinal direction outwardly of its connection to the equalizer.

8. In a railway car truck, wheels and axles, journal boxes for the axles; equalizers on opposite sides of the truck, supported by the journal boxes; a truck frame spring supported on said equalizers and free of association with the journal boxes except through said equalizers; a pair of U-shape anchors arranged horizontally, one of said anchors being connected to the equalizer at a point spaced inwardly of one of the boxes and to the truck frame at a point spaced in a longitudinal direction inwardly of its point of connection to the equalizer, and the other anchor being connected at one of the ends to the equalizer at a point spaced outwardly from the other journal box upon which it is supported and to the truck frame at a point spaced in a longitudinal direction outwardly from its connection to the equalizer the legs of the anchors having swivel bearing, respectively, in the equalizer and in the frame and including resilient means to cushion the forces transmitted between the equalizer and the truck frame.

KARL F. NYSTROM.
VERNON L. GREEN.